United States Patent
Pöppinghaus et al.

[11] Patent Number: 5,439,184
[45] Date of Patent: Aug. 8, 1995

[54] PRECISION WINDING METHOD AND APPARATUS

[75] Inventors: Winfried Pöppinghaus, Bad Sooden-Allendorf; Peter Siebertz, Hamminkeln, both of Germany

[73] Assignee: Georg Sahm GmbH & Co. KG, Eschwege, Germany

[21] Appl. No.: 31,637

[22] Filed: Mar. 15, 1993

[30] Foreign Application Priority Data

Mar. 16, 1992 [DE] Germany .............. 42 08 395.8

[51] Int. Cl.⁶ .............................................. B65H 54/38
[52] U.S. Cl. ............................ 242/18.1; 242/43 R
[58] Field of Search ............... 242/18 R, 18.1, 43 R

[56] References Cited

U.S. PATENT DOCUMENTS

| | | | |
|---|---|---|---|
| 4,093,146 | 6/1978 | Haley | 242/158.2 |
| 4,394,986 | 7/1983 | Hasegawa et al. | 242/18 R |
| 4,504,024 | 3/1985 | Gerhartz | 242/18.1 |
| 4,676,441 | 6/1987 | Maag | 24/18.1 |
| 4,771,961 | 9/1988 | Sugioka | 242/18.1 |
| 4,779,813 | 10/1988 | Sugioka et al. | 242/18.1 |
| 5,056,724 | 10/1991 | Prodi et al. | 242/18.1 |

FOREIGN PATENT DOCUMENTS

| | | |
|---|---|---|
| 0055849 | 7/1982 | European Pat. Off. . |
| 0194524 | 9/1986 | European Pat. Off. . |
| 0248406 | 12/1987 | European Pat. Off. . |
| 2512213 | 10/1976 | Germany . |

Primary Examiner—Daniel P. Stodola
Assistant Examiner—Michael R. Mansen
Attorney, Agent, or Firm—Hopkins & Thomas

[57] ABSTRACT

A method and apparatus for the reeling of a ribbon-like or filamentary material fed to a bobbin winder and wound up in cross winding with precision winding provides for the integrals of the angular velocity (impulses) of the bobbin to be recorded by a first sensor and the integrals of the angular velocity of the drive for the traversing thread guide by a second sensor, the sums of the integrals of the angular velocity to be compared with each other and the drive for the traversing thread guide to be regulated depending on this. The impulses of the first sensor are added in a first allocated counter and the impulses of the second sensor in a second allocated counter during the entire winding operation. The ratio of the sums produced in this way are constantly compared with one or more successively preselectable bobbin ratios and the drive for the traversing thread guide is regulated in such a way that the ratio of the sums of the two allocated counters corresponds to the predefined bobbin ratio or ratios, respectively, during the entire winding operation.

8 Claims, 8 Drawing Sheets

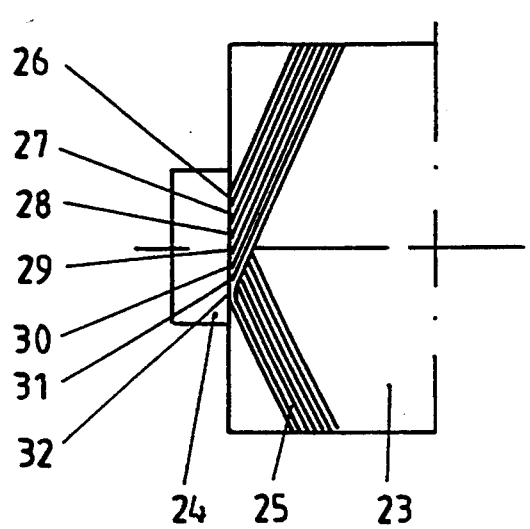
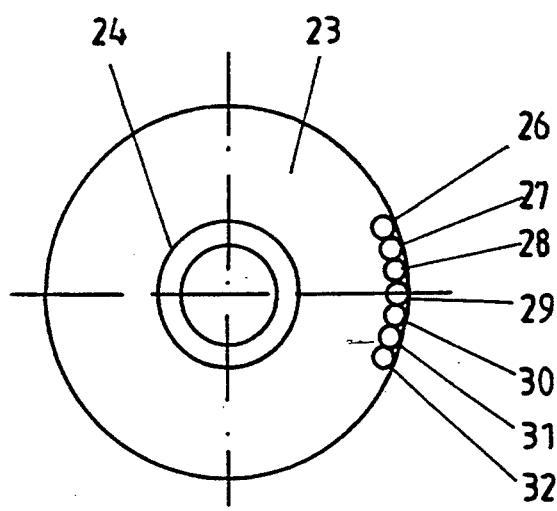
Fig. 16a  Fig. 16b
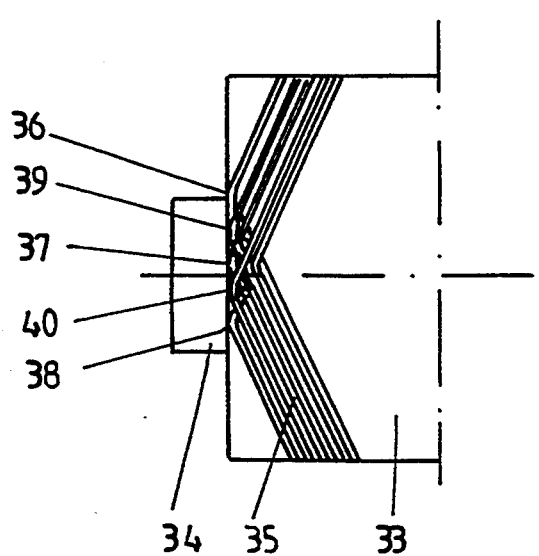
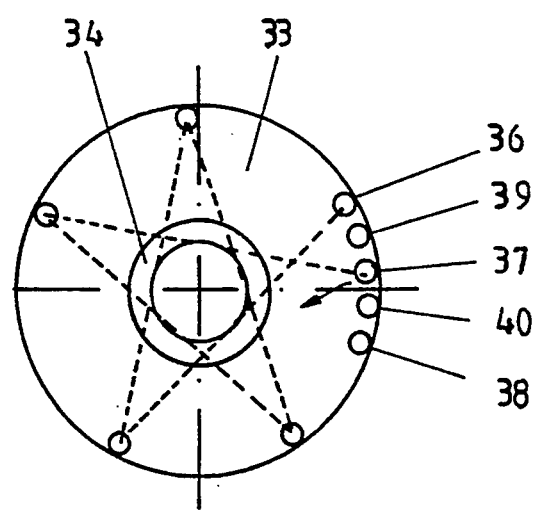
Fig. 17a  Fig. 17b

PRECISION WINDING METHOD AND APPARATUS

BACKGROUND OF THE INVENTION

The invention refers to a method for reeling a ribbon-like or filamentary material fed to a bobbin winder and wound up in cross winding with precision winding in which the integrals of the angular rotation of the bobbin are recorded as impulses by a first sensor and the integrals of the angular rotation of the drive for the traversing thread guide are recorded as impulses by a second sensor, the sums of the integrals of the angular rotation are compared with each other and the drive for the traversing thread guide is regulated depending on this. At the same time, the invention also comprises a bobbin winder for executing the method. The filamentary material which is to be wound is understood to include, in particular, threads and yarns or ribbons.

A method of the aforementioned type is known from U.S. Pat. No. 4,093,146 to Haley. Here, specific sensors supplying impulses are employed. A transmission is provided between the bobbin drive and the pulse generator, and this determines the bobbin ratio. The impulses registered are used exclusively for triggering a stepping motor which drives the traversing thread guide. The use of a stepping motor serves for altering the width passed over by the traversing thread guide. As a consequence of using a transmission having gear wheels, the reeling method is encumbered with all the disadvantages which will be explained in detail.

A method and a bobbin winder are known from EP-PS 55,849 in which cross winding in staged precision winding is employed. A first speedometer, which detects the bobbin r.p.m. per unit of time and transmits this to a regulator, is allocated to the bobbin or the bobbin spindle respectively. The drive for the traversing thread guide is also equipped with a speedometer. The two values of the speedometers are compared and fed to a regulator which itself in turn influences the drive for the traversing thread guide. The use of speedometers has various disadvantages. They must be adjusted at regular chronological intervals, they are temperature-dependent when in use and the accuracy with which they maintain a specific bobbin ratio is not perfect. A speedometer is an analog instrument, the accuracy of which depends on its design and construction.

U.S. Pat. No. 4,667,889 to Gerhartz also demonstrates a method for winding up threads in cross winding with staged precision winding. In order to achieve optimum thread placement on the bobbin, the bobbin ratios must not only be calculated in advance with great accuracy, but they must also be adhered to. As there is a limit to the electrical and electronic measuring and regulating technology for determining the rotational speeds and maintaining the proportion between the drive for the bobbin spindle and the drive for the traversing thread guide, it is proposed that in order to improve the winding build-up, the bobbin ratio be modulated in each reeling phase. The modulation width should be less than 0.1%.

SUMMARY OF THE INVENTION

It is the object of the invention to make available a method of the aforementioned type in which bobbin ratios can be realized and maintained with an accuracy of least seven decimal places.

According to the invention, this is achieved with a method of the aforementioned type in that the impulses of the first sensor are added in a first allocated counter and the impulses of the second sensor in a second allocated counter, respectively, during the entire winding operation. The ratio of the sums so produced are constantly compared with one or more successive, preselectable bobbin ratios, and the drive for the traversing thread guide is regulated in such a way that the ratio of the sums of the two allocated counters corresponds to the preselected bobbin ratio or ratios respectively during the entire winding operation.

According to the invention, the analog, instantaneous detection of the rotational speeds of the drives with an analog device is replaced by digital detection (impulse registration). This means that, during a winding operation, no error in the bobbin ratio deviation is added accumulatively but, on the contrary, the regulation is carried out in such a way that this error is eliminated and the exact, precalculated bobbin ratio is maintained precisely over the entire winding operation. Thus, the theoretically necessary yarn length is achieved exactly and in fact over the entire bobbin build-up. The achievable accuracy is considerably greater than, for example, with expensive, continuously variable transmissions. The method can also be carried out relatively easily, and all the disadvantages linked with the use of gear wheels are eliminated. The number of bobbin ratios which can be realized is almost infinite.

A multiplicity of angular rotation integrals (impulses) are processed per revolution of the bobbin and per revolution of the drive for the traversing thread guide. The accuracy rises due to the increase in the number of impulses. For example, 1024 impulses can be generated and processed per revolution. The drive for the traversing thread guide can be regulated in such a way that an accuracy of $\pm 1$ angular degree (corresponding to 3 impulses) is permissible or is compensated for, respectively.

The integrals of the angular rotation of the bobbin spindle and the traversing thread guide, i.e. the angular steps (impulses), are recorded individually, in sufficiently high resolution, through separate addition of all impulses from the bobbin spindle drive and the drive for the traversing thread guide recorded during a winding operation. The counters used are independent of each other and can be designed as hardware and/or software counters. Using a computer which influences the drive for the traversing thread guide via a regulator, the summation ratios are constantly checked for coincidence with the selected bobbin ratio. The influencing or the control of the traversing thread guide respectively, ends as soon as the ratio of the sums of the two counters once again corresponds to the bobbin ratio.

According to the invention, the bobbin winder for executing the method is characterized in that pulse generators are provided as sensors, that counters are arranged downstream of the pulse generators, that a computer is provided for processing the counts of the two counters, and that said computer is connected to the regulator for regulating the drive for the traversing thread guide. The counters have adequate capacity for the winding operation.

BRIEF DESCRIPTION OF THE DRAWINGS

In order to illustrate the problem with which the present invention is concerned, attention is to be drawn to the following details, as shown in the drawings, FIG. 16a is a schematic plan view of a bobbin with a bobbin holder and several layers of the material to be wound in closed precision cross winding, FIG. 16b is a schematic front view of the bobbin of FIG. 16a, FIG. 17a is a schematic plan view of a bobbin with a bobbin holder and several layers of the material to be wound in precision diamond (rhomboidal) winding, FIG. 17b is a schematic front view of the bobbin of FIG. 17a, FIG. 18 is a schematic view of a bobbin wound with a negative δ-value, FIG. 26b is a schematic plan view of the bobbin winder according to FIG. 26a.

DESCRIPTION OF THE PREFERRED EMBODIMENTS

From the material fed to it, the bobbin winder produces a bobbin which, depending on the contruction of the bobbin winder, can have the most diverse forms, as shown in FIGS. 1 to 11.

Figure 1:
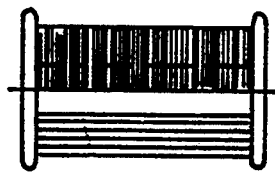
FIGS. 1-4 are schematic semi-cut views of bobbins in parallel winding.
Figure 2:
Figure 3:
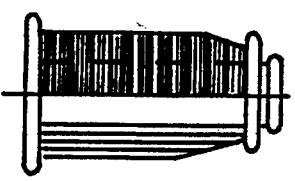
Figure 4:
Figure 5:
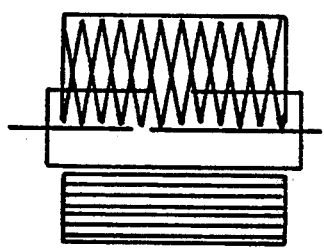
FIGS. 5-11 are schematic semi-cut views of bobbins in cross winding.

Here, FIGS. 1 to 4 show bobbins in parallel winding: the material is wound on in windings lying directly adjacent each other, the angle of the material to be wound on the holder or bobbin, respectively, roughly corresponds to the diameter/width of the material to be wound. To prevent the material to be wound from slipping down the sides of such a bobbin, special measures are necessary, such as supporting the windings by means of flanges on the bobbin holder, as shown in FIG. 1, and/or by means of a special form of winding build-up, for example, bevelling the front side of the bobbin, as shown in FIGS. 2, 3 and 4.

Figure 6:
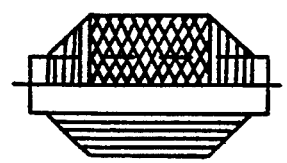
Figure 7:
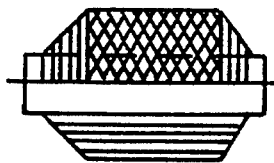
Figure 8:
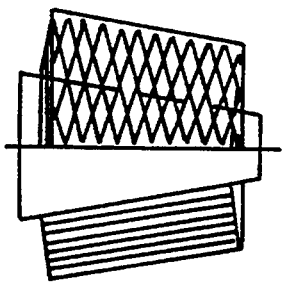
Figure 9:
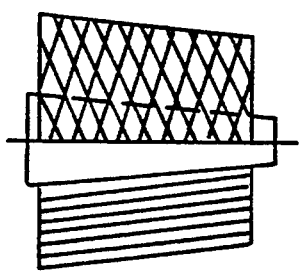
Figure 10:
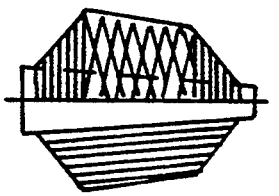
Figure 11:
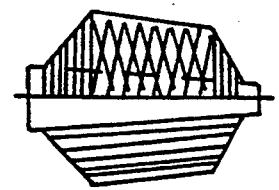

FIGS. 5 to 11 show bobbins in cross winding: the material to be wound is placed on the holder or bobbin respectively with a large angle relative to the diameter/width of the material to be wound. In this way, more or less severely rounded change points in the material to be wound occur on the front face of the bobbin. As these are covered by successive windings of the material to be wound, said material is prevented from slipping down the front face. The front faces of the bobbins can also have a special shape for particular application purposes, for example, a bevel, as shown in FIGS. 6 and 7.

Neither the holders nor the bobbins need to be cylindrical in shape; they can be tapered for example, as shown in FIGS. 8 to 11.

A bobbin winder essentially has a spindle, wherein said spindle, i.e. the bobbin spindle, winds up the material, possibly on a bobbin holder if required. Said bobbin winder also has a traversing unit which moves the material to be wound to-and-fro in the longitudinal direction of the bobbin spindle within a certain range, the wind-on width or stroke.

Figure 12A:
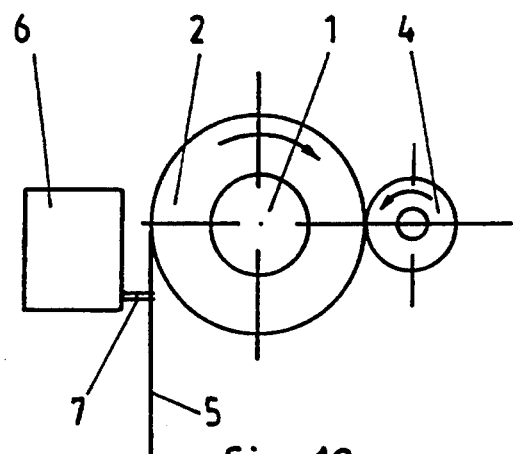
FIG. 12a is a schematic front view of a circumferential drive of a bobbin.
Figure 13A:
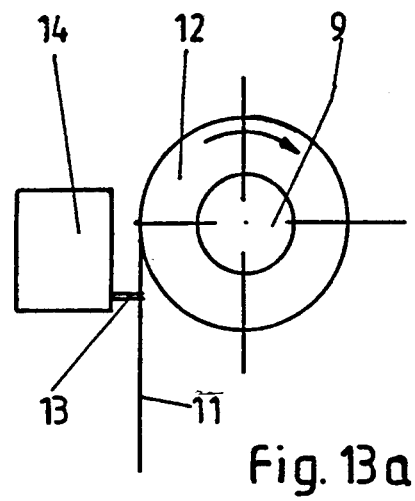
FIG. 13b is a schematic plan view of the direct drive of FIG. 13a, FIG. 14 is a schematic view of a bobbin in cross winding with random winding.
Figure 12B:
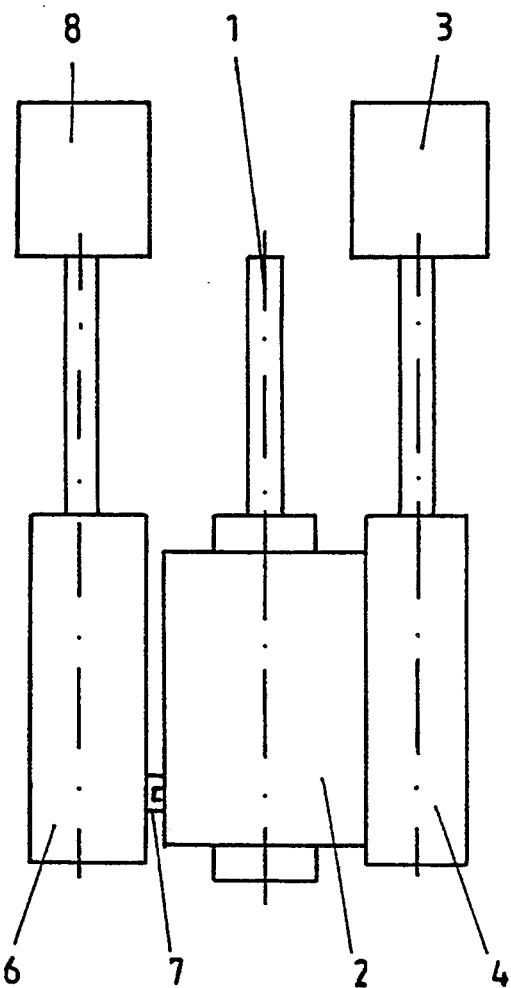
FIG. 12b is a schematic plan view of the device of FIG. 12a, FIG. 13a is a schematic front view of a direct drive of a bobbin spindle.
Figure 13B:
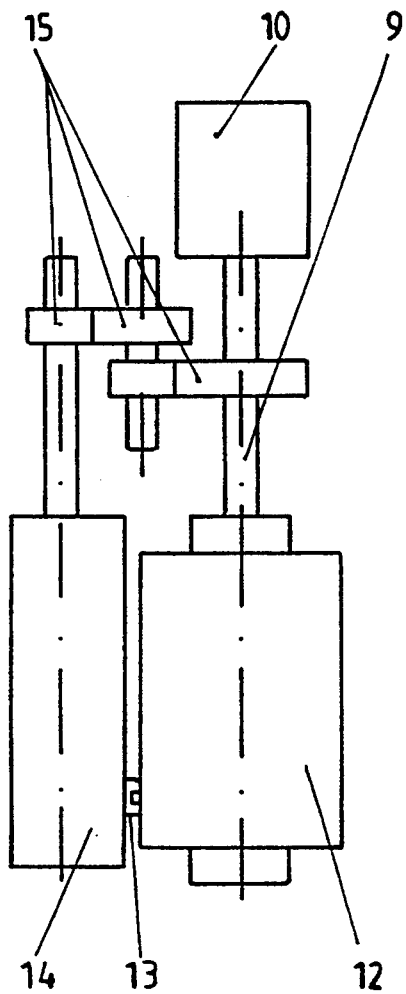

The bobbin spindle can be driven by means of a circumferential drive in peripheral engagement with the bobbin forming on the bobbin spindle, as shown schematically in the front and plan views in FIG. 12a and 12b, or by means of a direct drive to the bobbin spindle, as shown schematically in the front and plan views in FIG. 13a 13b.

With a circumferential drive on the bobbin 2 forming on the bobbin spindle 1 by means of a slubbing roller 4 (FIGS. 12a and 12b), the constant r.p.m. of the slubbing roller 4 driven by motor 3 inevitably results in a constant circumferential speed for the bobbin and, consequently, an almost constant reeling speed for the material to be wound 5.

With a direct drive to the bobbin spindle 9 by means of the motor 10 (FIG. 13b), to reach a constant reeling speed for the material to be wound 11, the r.p.m. of the motor 10 must be continuously regulated as the diameter of the bobbin 12 grows.

The rotations of the bobbin spindle 1 or 9, respectively, and the linear movement of the traversing thread guide 7 or 13, respectively, in the traversing unit 6 or 14, respectively, can have differing relations with respect to each other. This results in basic differences in the build-up of the bobbin.

Figure 14:
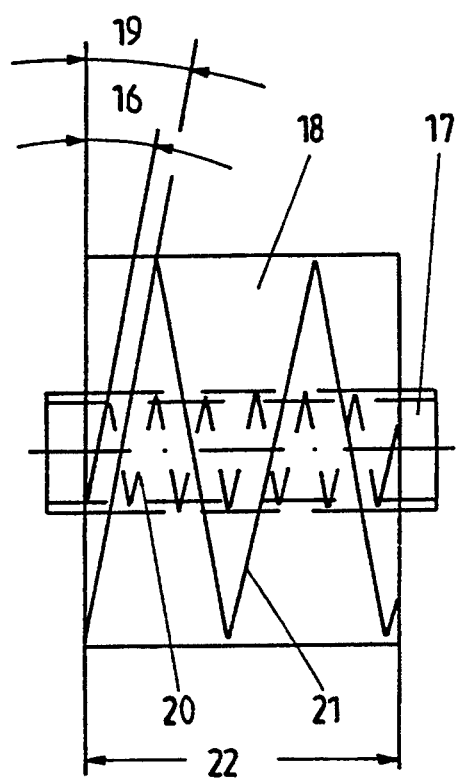

If, as FIGS. 12a and 12b show, the traversing unit 6 with traversing thread guide 7 is driven by means of a motor 8 having a rotational speed which is independent of the rotational speed of the bobbin spindle 1, this results in a bobbin build-up according to FIG. 14; this is designated as cross winding with random winding.

The chosen initial slant angle 16 for the material to be wound onto the bobbin holder 17, of the beginning of the reeling process or winding operation, remains constant until the end of the winding operation, at the largest diameter of the bobbin 18, having final slant angle 19, the number of windings 20 or 21, respectively, on the wind-on width 22 reduces all the time. A bobbin with a different packing density for the material to be wound for each bobbin diameter is the result.

Figure 15:
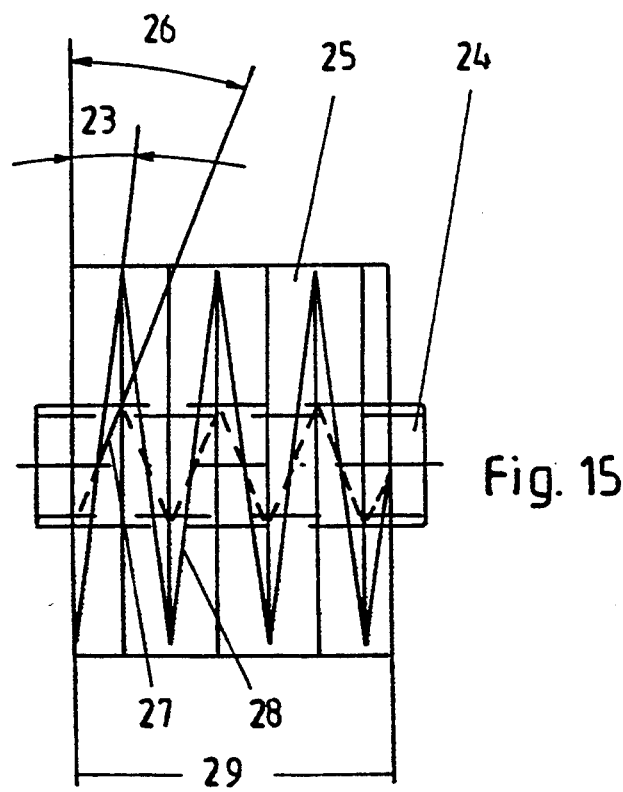
FIG. 15 is a schematic view of a bobbin in cross winding with precision winding.

If, as FIGS. 13a and 13b show, the traversing unit 14 with traversing thread guide 13 is connected via a transmission to the bobbin spindle 9, for example, by means of a spur gear 15, this results in a bobbin build-up according to FIG. 15; this is designated as cross winding with precision winding.

The initial slant angle 23 for the material to be wound onto the bobbin holder 24, at the beginning of the winding operation, decreases all the time up to the end of the winding operation. At the largest diameter of the bobbin 25, the number of windings 27 or 28 respectively on the bobbin wind-on width 29 remains constant. A bobbin with a consistent packing density for the material to be wound for each bobbin diameter is the result.

A corresponding ratio of one to-and-fro cycle of the traversing thread guide 13 to the number of revolutions of the bobbin spindle 9 is obtained from the choice of translation for the, for example, spur gear 15 from FIG. 13b. The path of the traversing thread guide 13 from one end of the wind-on width 22 (in FIG. 14) to the other end and back again is designated a to-and-fro cycle. The ratio of one to-and-fro cycle to the number of bobbin spindle revolutions is called the bobbin ratio.

The bobbin build-up differs depending on the bobbin ratio selected. For example, FIGS. 16a and 16b show, schematically, a bobbin 23 with bobbin holder 24 and several layers of the material to be wound 25 in closed precision cross winding. The material to be wound 25 is placed on the bobbin 23 in the sequence of the points 26 to 32 after each to-and-fro cycle. The points 26 to 32 represent the changes of direction of the material to be wound on one front face of the bobbin 23. The nominal bobbin ratio might be, for example, 1:5 here. In order to establish the actual bobbin ratio, the component which results from the thickness or width of the material to be wound has to be calculated so that the individual layers of the material to be wound lie exactly adjacent to each other instead of only precisely one on top of the other.

As a further example, FIGS. 17a and 17b show a bobbin 33 with bobbin holder 34 and some layers of the material to be wound 35 in precision diamond (rhomboidal) winding. The individual layers of the material to be wound 35 are placed here on bobbin 33 in the sequence of the points 36 to 40. The dotted line indicates the sequence in which the material to be wound 35 is placed on the front face of the bobbin 33. Beginning at point 36, four further changes of direction are first passed through before the material to be wound 35 is placed at point 37, i.e. before it returns to the area of the starting point, point 36. In addition, during the continuing course of the reeling process, a further layer of the material to be wound 35 is placed between points 36 and 37, at point 39. A defined distance (separation) exists between the individual, adjacent layers of the material to be wound. This means that an open build-up of the bobbin bundle is achieved, something that is necessary for dyeing bobbins. The nominal bobbin ratio might be, for example, 1:5.2 here. Once again, in order to establish the actual bobbin ratio, the component which results from the thickness or width of the material to be wound has to be calculated so that the individual layers of the material to be wound lie exactly adjacent to each other as desired, instead of only exactly on top of each other.

Figure 18:
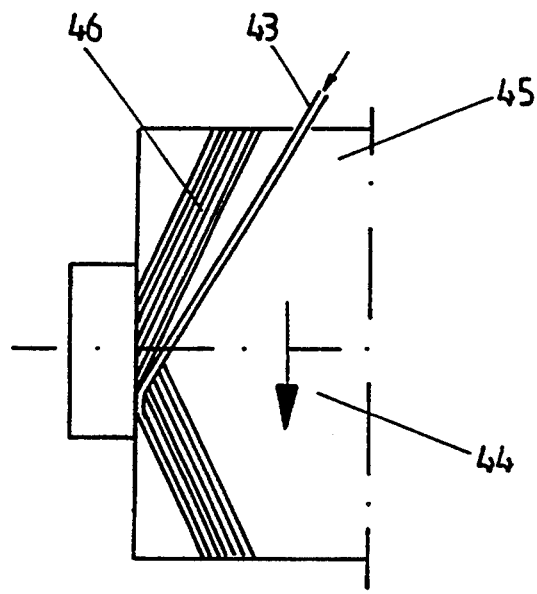
Figure 19:
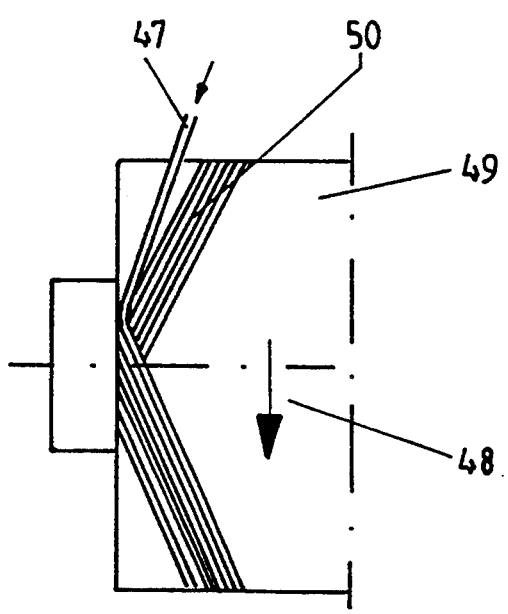
FIG. 19 is a schematic view of a bobbin wound with a positive δ-value.
Figure 20:
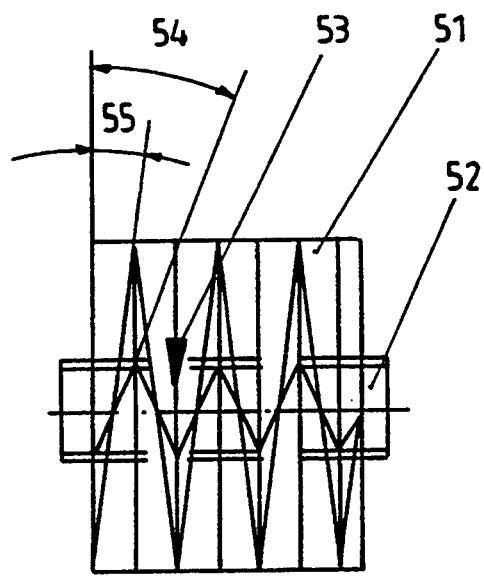
FIG. 20 is a schematic view of a bobbin in cross winding with precision winding.

The component which results from the thickness or width of the material to be wound so that the successive layers of the material to be wound lie exactly adjacent to each other as desired is called the δ-value. With a negative δ-value, a forward-running placement of the material to be wound is obtained, as shown in FIG. 18. The material to be wound on 43 is placed in front of the material already wound 46 onto the bobbin 45 rotating in the direction of the arrow 44. With a positive δ-value, a backward-running placement of the material to be wound is obtained, as shown in FIG. 19. The material to be wound on 47 is placed behind the material already wound 50 onto the bobbin 49 rotating in the direction of the arrow 48.

In order to explain FIGS. 21 to 24, FIG. 20 shows a bobbin 51 in cross winding with precision winding having a bobbin holder 52 and rotating in the direction of arrow 53. The material to be wound is placed on the holder with the initial slant angle 54, with a final slant angle 55 at the outer bobbin diameter.

Figure 21:
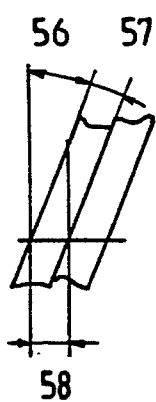
FIGS. 21-24 are detail views of adjacent ribbons in different relative arrangements.

FIG. 21 shows a close-up of two directly adjacent ribbons, as an example of the material to be wound, on the bobbin holder with the initial slant angle 56 and a width of ribbon 57. The required δ-value results from these two values.

Figure 22:
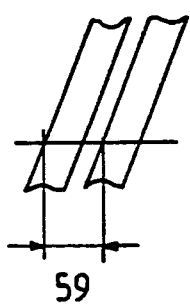
Figure 23:
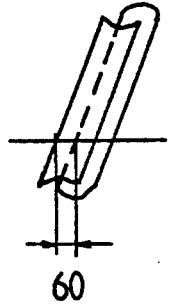
Figure 24:
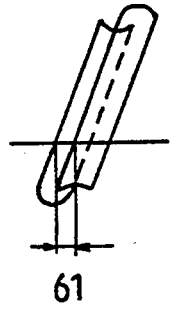

As was already clear from the description of FIGS. 17a and 17b, two successive layers of the material to be wound need not necessarily lie directly adjacent to each other; there can be a gap between, as shown in FIG. 22, or they can, specifically in the case of ribbon, also be arranged partly on top of each other, as is illustrated in FIG. 23 for backward-running placement of the medium to be wound, and in FIG. 24 for forward-running placement.

Taking into account the δ-value, the above mentioned example of the nominal bobbin ratio of 1:5 now gives, for example, an actual, required bobbin ratio of 1:5.13256479834..., and this must be reproduced as accurately as possible by means of, for example, a spur gear. In practice, it has been shown that a deviation in the fifth or even the sixth decimal place of the bobbin ratio has a considerable influence on the bobbin buildup.

From these embodiment versions it is clear that the bobbin ratio depends on the targeted bobbin build-up, the width or the thickness, respectively, of the material to be wound and the dimensions of the bobbin holder and bobbin. Therefore, a positive drive for the bobbin transmission such as the spur gear 15 cited as an example, is as a rule only suitable if all the parameters mentioned remain unaltered; a modification to even just one of these parameters will in most cases mean that the spur gears in the transmission have to be exchanged, entailing considerable costs, because a bobbin machine can comprise a large number of bobbin winders. Last but not least, such a transmission is only a compromise because in most cases the calculated bobbin ratio cannot be realized using the spur gears which are available.

Figure 25:
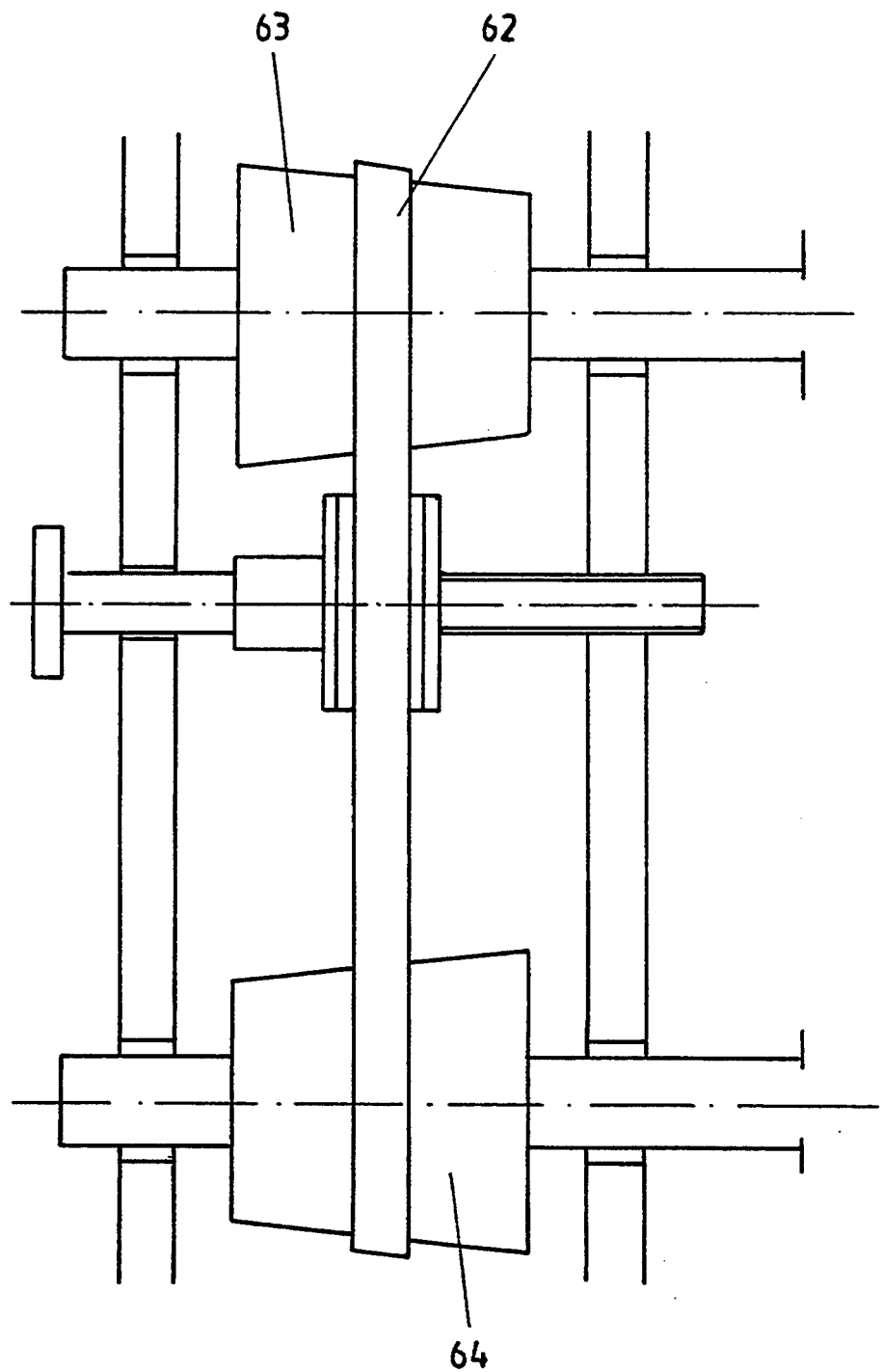
FIG. 25 is a schematic view of a conoid gear bobbin transmission.

In order to solve the problems which have been mentioned, a controlling mechanism, for example, a conoid gear, is often employed as a bobbin transmission in practice, as is schematically illustrated in FIG. 25. The bobbin ratio can be varied continuously within certain limits by lateral displacement of the flat belt 62 on the two conical pulleys 63 and 64 working in opposing directions. The disadvantageous effect with this transmission is that it is non-positive and, hence, is afflicted by slip, and is, therefore, not sufficiently accurate. Setting to the necessary accuracy can only be guaranteed on rare occasions and can hardly ever be transmitted to all the bobbin winders of a bobbin machine, which can comprise a great number of bobbin winders. In addition, the tight limits, within which the bobbin ratio can be varied, have a disadvantageous effect.

Newer techniques measure the r.p.m. of the bobbin spindle and traversing unit, compare the measured r.p.m. ratio with the required bobbin ratio and readjust, for example, the conoid transmission correspondingly upon reaching a certain value for the deviation in the r.p.m. The same method is also employed if the traversing unit is driven by means of a separate motor instead of a conoid transmission. Therefore, in order to implement the readjustment, a certain deviation in the r.p.m. between target and actual value must first be reached. Until the permissible r.p.m. deviation is reached and afterwards until by controlling coincidence of target and actual value is reached, reeling will consequently take place with an inaccurate bobbin ratio which, even if not over the entire bobbin, leads to a poor bobbin build-up over at least some of the bobbin diameter ranges.

In order to demonstrate the size of the error with this known method, let it be assumed that the ratio between the r.p.m. of the bobbin spindle drive and the r.p.m. of the traversing unit drive exhibits the typical permissible deviation of 1%. With a rotational speed for the traversing unit drive of, for example, 3000 r.p.m., this results in an error of up to 3 r.p.m. If the winding operation takes, for example, 12 hours, then this gives an error of up to 2160 revolutions or up to 777,600 angular degrees.

Figure 26A:
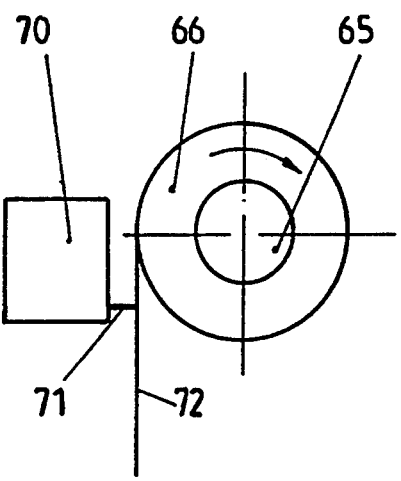
FIG. 26a is a schematic front view of the main elements of a bobbin winder.
Figure 26B:
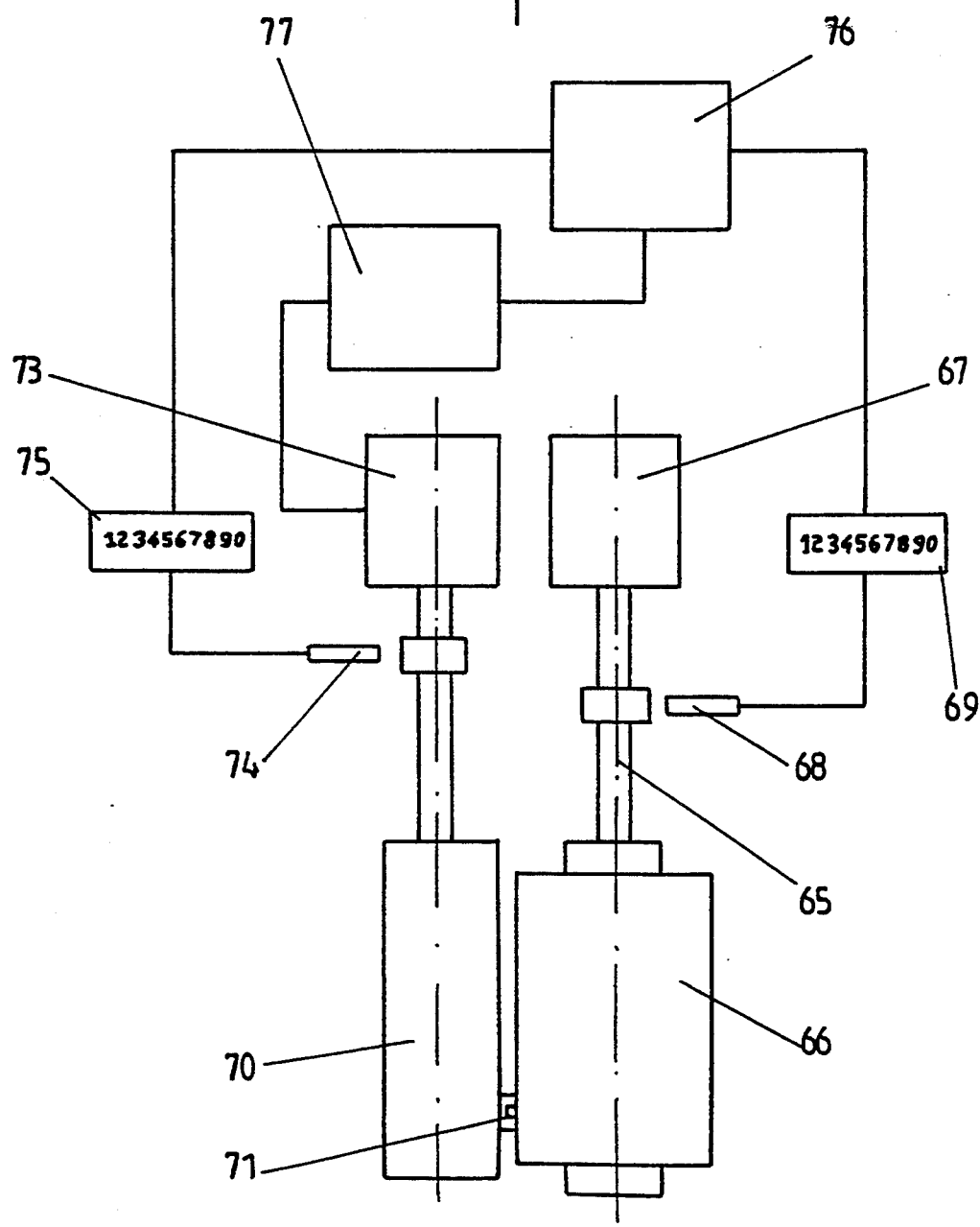

The main elements of an improved bobbin winder are illustrated schematically in FIGS. 26a and 26b. A front view (FIG. 26a) and a plan view (FIG. 26b) are illustrated with a bobbin spindle 65, a bobbin 66, a drive motor 67 for the bobbin spindle, a first allocated sensor 68, a first allocated counter 69, a traversing unit 70, a traversing thread guide 71, a material to be wound on 72, a drive motor 73 for the traversing unit, a second allocated sensor 74, a second allocated counter 75, a computer 76 and a regulator 77.

OPERATION

At the start of a winding operation, the two allocated counters 69 and 75 have the value 0. As soon as the drive motor 67 sets the bobbin spindle 65 rotating, the first allocated counter 69 receives, for example, 1024 impulses per revolution of the bobbin spindle from the first allocated sensor 68 and registers these. Directly after the bobbin spindle begins to rotate, the second allocated counter 75 still has the value 0. As soon as the computer 76 evaluates the value of the first allocated counter 69, it places this in the ratio to the value of the second allocated counter 75 and compares this ratio with the predefined bobbin ratio. As a deviation is inevitably present here, the computer immediately activates the regulator 77. This thereupon triggers the drive motor 73, whereupon the second allocated counter 75 also receives, for example, 1024 impulses per revolution of the drive for the traversing unit 70 from the second allocated sensor 74. This value is again picked up by the computer which evaluates it as described previously and synchronizes the drive for the traversing unit 70, via the regulator 73, in the sense of the desired bobbin ratio. This procedure is repeated constantly, in fact with a clock rate which only permits a deviation from ±0.35 to a maximum of 1 degree of rotation. As the impulses of sensors 68 and 74 are added constantly in the counters 69 and 75 during the winding operation, these impulse sums is evaluated by the computer 76 and compared against the predefined bobbin ratio via the regulator 77 and the drive motor 73 for the traversing unit 70. A one-off error occuring within the limits from ±0.35 to max. 1 degree of rotation is corrected immediately. The deviation between target and actual bobbin ratio is, therefore, at no time during the winding operation greater than ±1 degree of rotation. Almost any accuracy of bobbin ratio can be represented by appropriate dimensioning of the microprocessor(s) which is/are integrated in the computer 76; the bobbin ratio does not depend on the usage of any particular parts, for example, spur gears, it can correspond to the calculated value.

We claim:

1. A method of precisely controlling the reeling of a ribbon-like or filamentary material fed to a bobbin winder, the material being wound on the bobbin with precision winding, comprising the steps of continuously:
   a. recording the numerical value of the angular rotation of the bobbin as impulses with a first sensor;
   b. recording the numerical value of the angular rotation of the traversing thread guide as impulses with a second sensor;
   c. adding the impulses recorded by the first sensor in a first counter;
   d. adding the impulses recorded by the second sensor in a second counter;
   e. comparing the ratio of the sums of the impulses added in the first counter and the sums of the impulses added in the second counter against a range of preselected bobbin ratios;
   f. synchronizing the angular rotation of the bobbin with the angular rotation of the traversing thread guide; and
   g. regulating the angular rotation of the traversing thread guide so that the ratio of the sums of the impulses from said first and second sensors corresponds to a range of predefined bobbin ratios during the entirety of the winding of the material on the bobbin.

2. The method of claim 1, further comprising the step of generating a plurality of angular rotation impulses per revolution of the bobbin, and generating a plurality of angular rotation impulses per revolution of the traversing thread guide.

3. The method of claim 1, wherein the step of regulating the angular rotation of the traversing thread guide comprises the step of regulating the traversing thread guide angular rotation within a range of plus and minus 1 angular degree of rotation from the preselected bobbin ratios.

4. A bobbin winder for precisely controlling the reeling of a ribbon-like or filamentary material on a bobbin, the bobbin being wound with precision winding, the bobbin winder including a traversing thread guide, a drive for the bobbin winder, and a drive for the traversing thread guide, comprising:
   a first sensor for recording the numerical value of the angular rotation of the bobbin as impulses;
   a second sensor for recording the numerical value of the angular rotation of the traversing thread guide as impulses;
   a first counter for adding the impulses recorded from said first sensor;
   a second counter for adding the impulses recorded by said second sensor;
   a computer for comparing the sums of the impulses recorded by said first and second sensors, wherein said computer generates a ratio representative of the angular rotation of the bobbin with respect to the angular rotation of the traversing thread guide; and
   a regulator for regulating the angular rotation of the traversing thread guide in response to the generated ratio to synchronize the angular rotation of the bobbin with the angular rotation of the traversing thread guide so that the ratio of the sums of the impulses from said first and second sensors correspond to a predefined bobbin ratio selected by said computer during the entirety of the winding of material on the bobbin.

5. The bobbin winder of claim 4, wherein the drive for the traversing thread guide is a variable speed motor.

6. The bobbin winder of claim 5, wherein said regulator varies the speed of said traversing thread guide drive motor.

7. The bobbin winder of claim 4, wherein said first sensor and said second sensor each comprise a pulse generator.

8. The device of claim 4, wherein said first and said second counters are each adapted to convert the impulses received from said first and second sensors, respectively, into a numerical value.

* * * * *